United States Patent [19]

Chang et al.

[11] Patent Number: 4,725,834
[45] Date of Patent: Feb. 16, 1988

[54] RELIABLE BROADCAST PROTOCOL FOR A TOKEN PASSING BUS NETWORK

[75] Inventors: Jo-Mei Chang, New Providence; Nicholas F. Maxemchuk, Mountainside, both of N.J.

[73] Assignee: American Telephone and Telegraph Company, AT&T Bell Laboratories, Murray Hill, N.J.

[21] Appl. No.: 57,680

[22] Filed: May 28, 1987

Related U.S. Application Data

[63] Continuation of Ser. No. 584,100, Feb. 27, 1984, abandoned.

[51] Int. Cl.[4] .................................................. H04Q 1/00
[52] U.S. Cl. ..................................... 340/825.5; 370/85
[56] References Cited

U.S. PATENT DOCUMENTS

| | | | |
|---|---|---|---|
| 3,715,725 | 2/1973 | Kievit et al. | 340/825.53 |
| 4,058,681 | 11/1977 | Imaizumi et al. | |
| 4,199,662 | 4/1980 | Lowe | 370/85 |
| 4,430,651 | 2/1984 | Bryant et al. | 340/825.52 |
| 4,491,946 | 1/1985 | Kryskow, Jr. et al. | 370/89 |

OTHER PUBLICATIONS

Computer Communications, vol. 2, No. 5, Oct. 1979, "Survey of Computer Communications Loop Networks: Part 2", by B. K. Penny et al., pp. 224–241.
IEEE Transactions on Communications, vol. Com-28, No. 4, Apr. 1980, "Multiaccess Protocols in Packet Communication Systems", by Fouad A. Tobagi, pp. 468–488.
IEEE International Conference on Communications, Jun. 13, 1987, "Cablenet: A Local Area Network", by Isaac (Zak) Kong, pp. 6C2.1–6C2.5.
David D. Clark et al., "An Introduction to Local Area Network", Proceedings of the IEEE, Nov. 1978, pp. 1497–1517.

Primary Examiner—Ulysses Weldon
Attorney, Agent, or Firm—Richard J. Roddy; Henry T. Brendzel

[57] ABSTRACT

A system, station apparatus and protocol for broadcasting messages to a plurality of stations which contemplate a primary receiver, also called a token site. The primary receiver is adapted to receive and store information messages transmitted from a source station to a broadcast group stations. The source continues to retransmit the broadcast message until it receives an acknowledgment control message from the primary receiver. In the event some receiver or receivers in the broadcast group do not receive the broadcast message, such receiver or receivers could request a retransmission of the message. The primary receiver, not the source station, would retransmit the broadcast message, thereby assuring a reliable broadcast system. The token site function can be rotated among the various receivers in the broadcast group to reduce storage costs. The possible token sites are identified in a token list to which stations may be added or from which stations may be deleted. The token list is transmitted to all stations in the broadcast group to assure that no more than one token site exists at any instant of time.

39 Claims, 6 Drawing Figures

FIG. 5

*Originator*                                          $site_i$

Phase I:
   start reformation;
   broadcast an invitation, $X_1$, for all
   operable sites to join reformation group.

Phase I:
                                receive $X_1$:
                                start reformation;
                                vote yes to join reformation group,
Phase II:                      vote no, if already in another group.
   sites voted yes forms the new token list,
   if list valid,
      broadcast new list, $X_2$, to all sites in the new list;
   else
      broadcast release message, $E_r$.

Phase II:
                              receive $X_2$,
                                  vote yes, if still committed to this group,
                                  vote no, if already in another group.
                              receive $E_r$,
                                  end of reformation.
                                  return to old token list.
Phase III:                   *timeout*, move back to old list
   If all sites voted yes,
      generate new token and broadcast $X_3$
      to pass token to new token site,
   else
      end of reformation, transmit $E_r$.

Phase III:
                              receive $X_3$,
                                  commit to new token list
                                  end of reformation
                              receive $E_r$,
                                  end of reformation
                                  return to old token list
                            *timeout*, move to new list

RELIABLE BROADCAST PROTOCOL FOR A TOKEN PASSING BUS NETWORK

This application is a continuation of application Ser. No. 584,100, filed Feb. 27, 1984, now abandoned.

TECHNICAL FIELD

This invention relates to communications arrangements and, more particularly, to multiple access digital communications systems, apparatus, and protocols for use therein.

BACKGROUND OF THE INVENTION

In the early days of the telephone art, use of the telephone was often confined to communications among users within a local geographic area. As a result and over the years, the economies related to accessing a communications system have lead to telephones in a local area usually being interconnected through a central controller, often called a local central office in the art.

As digital computers came upon the scene, another local community of use was discernible. Hence, a central controller is commonly employed for interconnecting various user terminals. For example, U.S. Pat. No. 3,851,104; entitled "Digital Communications System" and issued Nov. 26, 1974; discloses a time division multiple access communications system which, under the control of a central terminal, provides communication links among a plurality of user terminals by way of a single communications signal path.

As the digital computer art advanced, parallel advances in the semiconductor art have lead to smaller, relatively inexpensive computers, commonly referred to as microprocessors. With the advent of such smaller computers, the technique of central control is being abandoned in favor of a distributed control technique which allows the distributed microprocessors to exercise more sophisticated communication control. Also, because of the usually bursty nature of digital information, the recent trend has also been toward communications systems having a capability for handling packets of digital information. One such distributed control communications system is disclosed in U.S. Pat. No. 4,063,220; entitled "Multipoint Data Communication System with Collision Detection" and issued Dec. 13, 1977. Indeed, U.S. Pat. No. 4,063,220 discloses a communications system in which, when a terminal is to start an intended transmission on a communications path, a phase decoder detects the presence of other transmissions on the path and, responsive thereto, delays the intended transmission until no other transmissions are sensed. Once a transmission has started, if an interference (or collision) therewith is detected, a random number generator is used to select an interval of time, at the completion of which a retransmission of the packet will again be attempted.

The single path of U.S. Pat. No. 4,063,220 is shared by all terminals (or stations or sites). Since all terminals share the single path, it is possible to transmit a message from one terminal to a plurality of terminals. Such a message is characteristically called a broadcast message. It should come as no surprise then that the art is looking for a reliable transmission protocol which can assure that all terminals, which are intended to receive a broadcast message, do indeed receive the broadcase message.

SUMMARY OF THE INVENTION

These and other problems are solved with the instant system, station apparatus and protocol which contemplate a primary receiver, also called a token site. The primary receiver is adapted to receive and store information messages transmitted from a source station to a broadcast group. The source would continue to retransmit the broadcast message until it receives an acknowledgment control message from the primary receiver. In the event some receiver(s) in the broadcast group do not receive the broadcast message, such receiver(s) could request a retransmission of the message. The primary receiver, not the source station, would retransmit the broadcast message, thereby assuring a reliable broadcast system. The token site function can be rotated among the various receivers in the broadcast group to reduce storage costs. The possible token sites are identified in a token list to which stations may be added or from which stations may be deleted. The token list is transmitted to all stations in the broadcast group to assure that no more than one token site exists at any instant of time.

BRIEF DESCRIPTION OF THE DRAWING

The invention should become fully apparent when taken in connection with the following detailed description and accompanying drawing in which:

FIG. 5 illustrates in state form a reformation aspect of the invention protocol and useful in describing the principles of the invention.

DETAILED DESCRIPTION

Figure 1:
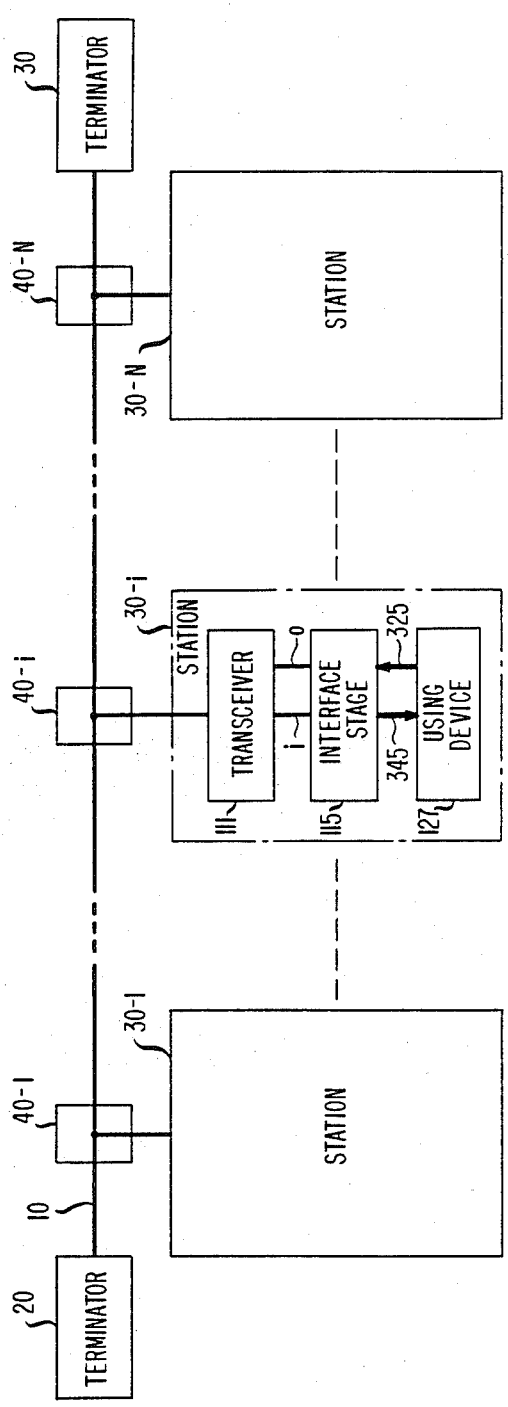
FIG. 1 illustrates an arrangement including a plurality of stations interconnected with a single communications path, which arrangement is useful in describing the principles of the invention.

Referring to the illustrative system structure shown in FIG. 1, which structure broadly parallels the structure disclosed in the aforecited U.S. Pat. No. 4,063,220, the teachings of which are herein incorporated by refrence, bidirectional communications signal path 10 is illustrated as extended between terminators 20 and 30 and through each of a plurality of cascaded transmission couplers such as passive coupler 40-i. Bidirectional path 10 may be, among other choices, a conventional high frequency coaxial or fiber optic cable. Each of terminators 20 and 30 may be a conventional impedance matching device for limiting reflections. Each of couplers 40-1 through 40-N may be a conventional T-connector which is insertable in path 10 so that each respective one of stations 30-1 through 30-N is coupled to the communications link thereby formed, the coupling being through the respective transmission coupler. In particular, on the one hand, coupler 40-i is for electrically coupling signals, representing, for example, information or control messages which signals are detected on communications path 10 and are to be coupled to, or received at, station 30-i. In that manner, station 30-i may read (or receive) signals on communications path 10. Thus the station is a "receiver". On the other hand, coupler 40-i is for coupling signals representing, for example, information or control messages, which signals are to be transmitted from station 30-i over communications path 10. In that manner, station 30-i may write (or transmit) messages on communications path 10. Thus the station is a "transmitter."

The structure illustrated in FIG. 1 need not include any electronics on path 10. Rather, the path could include only passive couplers. Thereby, the likelihood of the path becoming electrically opened is mitigated and its reliability increased.

Alternatively, electronic amplifiers and the like may be included on path 10 for amplifying and compensating the path signals, e.g., in a system, responsive to the detection of an electrical open or other failure, one or more stations may be adapted to insert electrical terminator(s) thereby forming two or more separate systems, each with a single path, to mitigate the deleterious effects of a failure.

Station 30-i may include transceiver 111 interface stage 115, and as a using device, station terminal equipment 127. In turn, terminal equipment 127 could include equipment such as a digital computer or a digital interface unit. The digital interface unit, for example, could be used for interconnecting path 10 with one or more other paths, some of the other paths perhaps being geographically distant from the instant path. It may be noted that the numeric designations for elements 111, 115, and 127 have correspondingly numbered elements in U.S. Pat. No. 4,063,220, incorporated above, and serve the same general function. In light of the availability of microprocessors, elements 111 and 115 are most advantageously implemented with such microprocessors to incorporate in transceiver 111 and interface unit 115 the control functions described below.

As an aside, it is common in the art that, when the stations are electrically relatively close to each other, e.g., within about two kilometers of each other, such an arrangement is referred to as, among other things, a local communications network or as a local digital loop or a local area network. Thus, in line with the structure illustrated in FIG. 1, a plurality of local networks may be interconnected for forming a still larger communications system.

As a further aside, itis well known that electrical signals, depending upon the electromagnetic transmission characteristics of the transmission medium, typically propagate on a communications path at a speed in the range 0.6 to 0.9 of the speed of light, which is estimated here to be about 186,000 miles per second. For ease of discussion, the estimated speed of light is here translated to an electromagnetic propagation speed of approximately one foot per nanosecond. Accordingly, it should be clear that path 10 may be busy at a station, e.g., at station 30-i, only while a packet is electrically being received or transmitted at the station; otherwise path 10 is not busy at least as to station 30-i. Thus, path 10 can be busy as to one station and not busy as to another station.

As will be made more clear shortly, the instant protocol contemplates two general types of packet, each general type contemplating one or more specific subtypes of packet. Here one general type is an information message and the other is a control message. For illustration, each packet is assumed to include a plurality of fields, each field including one or more bits. For example, referring to FIGS. 2 and 3, the two general types of packet may include a preamble field for timing and synchronizing, here shown as including eight bits, a destination station address field for identifying the called station, here shown as including eight bits, and a packet type field for identifying the general type of packet, here shown as including two bits.

As to the destination address field, it is contemplated that there will exist a plurality of terminals coupled to path 10, which terminals comprise a broadcast group. Further, there may exist a plurality of broadcast groups coupled to path 10 where each such broadcast group includes some predefined plurality of terminals. Each broadcast group has a unique destination address, which may also be called a broadcast address. The broadcast address is recognized by each terminal in the broadcast group so that each such terminal may adapt itself to receive information and control messages.

As to the packet type field, although other encodings are possible, the two bit field may be encoded with the following sense:

| Packet type Field | Message Type |
|---|---|
| 00 | broadcast |
| 01 | retransmission |
| 10 | control |
| 11 | None of the above |

An encoding of "11" could means for example a non-broadcast message, i.e. one intended for a single station. Indeed the field may use more than two bits to allow still other message types.

Figure 2:
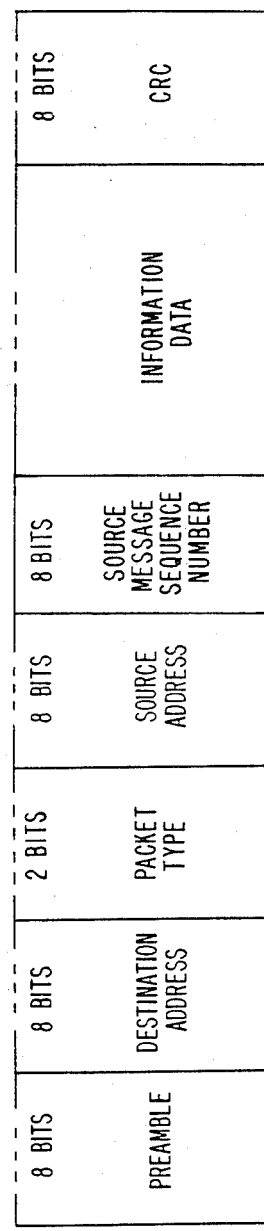
FIG. 2 illustrates an information message packet format useful in describing the principles of the invention.

Now as to the other fields in a packet, FIG. 2 illustrates a first type of packet, i.e., an information message. Here we assume two subtypes of information message—one a broadcast message and the other a retransmitted message. Each information message further includes a source station address field for identifying the calling station, here shown as including eight bits, a source message sequence number for identifying within the source the specific message being transmitted, here shown as including eight bits, a data field for inserting the "information" to be transmitted, here shown as including a variable number of bits, and an error control field for checking the packet here shown as including eight bits. One error control field may include a well known cyclic redundancy code (CRC).

Figure 3:
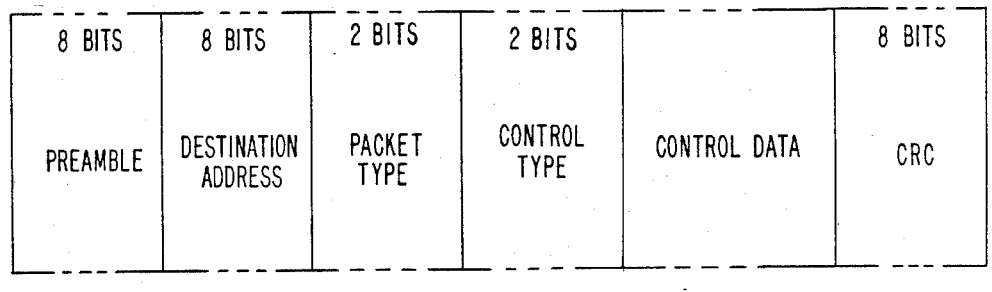
FIG. 3 illustrates a control message packet format useful in describing the principles of the invention.

FIG. 3 illustrates a second type of packet, i.e. a control message. Each control message includes a control message type field for identifying a subtype of control message, here shown as including two bits.

As to the control message type field, although other encodings are possible, the two bit field may be encoded with the following sense:

| Control Type Field | Message Type |
|---|---|
| 00 | Acknowledgment |
| 01 | Retransmission request |
| 10 | Confirmation |
| 11 | Request for token list |

Indeed the field may use more than two bits to allow still other control types.

As to an acknowledgment control message, the control data field may include a source station address field for identifying the calling station, a source message sequence number for identifying within the source the specific message, a global timestamp for indentifying the specific message from among all messages in the system, the number of the present token site, the number of the present token list version, and the address of the next token site. For a more complete description of a global timestamp reference is made to L. Lampost, "Time Clocks, and the Ordering of Events in a Distributed System," *Communications of the ACM*, Vol. 21, No. 7 (July 1978) pp. 558-565. Also, a token can be embodied as an acknowledgment control message which does not acknowledge a broadcast message. In similar fashion, the communications related to out hereinafter described token reformation process can be embodied through similar encodings of an acknowledgment control message. The other fields will be made clearer hereinafter.

We are now getting closer to a more specific description of the instant protocol. However, on the one hand, consider a system with a plurality of sources, i.e. transmitters, and with a single receiver. The receiver can acknowledge each message received from each of the sources. Since there is only one receiver, the messages can be received in only one sequence. Therefore in such a system, a source could continue to transmit a message until the single receiver acknowledges that it has received the message. This system can be referred to as a positive acknowledgment system.

On the other hand, consider a system with a single source and with a plurality of receivers. The source can assign a unique source message sequence number to each message that it transmits. The source message sequence number then identifies within the source the specific message. As a result, each receiver can request message(s) which have not been successfully received by simply requesting that the source retransmit a message which is identified by its source message sequence number. The receiver can determine whether a message has not been successfully received by comparing the source message sequence numbers. For example, if a receiver has received message number 7 and message number 11 from some source, the receiver may readily be adapted to request a retransmission of message numbers 8, 9 and 10. In this system, a source does not have to retransmit a message unless and until the receiver requests the retransmission of the message. This system can be referred to as a negative acknowledgment system.

In a third system, the third system being in accord with the principles of our invention, a plurality of transmitters (i.e. stations) are intended to communicate among a plurality of receivers (i.e. stations).

In accord with one aspect of the principles of our invention, our system can be made to operate in such a manner that the resultant system looks like a system with a single transmitter. This can be accomplished by passing all messages through a primary receiver. The primary receiver function includes, among other steps, the step of assigning a special message sequence number, called a global timestamp, to each message. One result of this protocol is that all receivers are made to receive messages in the same sequence or order that messages are received at the primary receiver.

Recognizing that it may not be possible to verify that each receiver has received all messages, it may be necessary that broadcast messages be retained indefinitely for possible retransmission. Unfortunately such retention can lead to costly storage expense. Such deficiencies may be mitigated in accord to another aspect of the principles of our invention by rotating the primary receiver function among the different receivers in the respective broadcast group. Therefore, at one instant of time, there is one station in each broadcast group which acts as the primary receiver for the respective broadcast group.

The primary receiver function can be rotated, or passed or transferred, from one station to another station in either an explicitly defined way or in an implicitly presumed way. For example, a token may be passed from a present primary receiver to a next primary receiver. In such a case the primary receiver may also be referred to as the token site. Of course certain conditions precedent may be required before the primary receiver responsibility may be rotated. For example, it may be required that the next primary receiver have received all the globally timestamped messages before accepting the primary receiver function.

Now we get a bit more specific. Functions related to the instant system, station apparatus and protocol can be bifurcated as between a transmitter function and a receiver function.

As to a transmitter function within each station 30-i, the broadcast protocol is responsible for transmitting and retransmitting a message, i.e. an information message, until either the appropriate response message, i.e. control message, is received or it is concluded that the responding station is inoperable, e.g., at least, is not operating properly. On the one hand, when it is concluded that the responding station is inoperable, the transmitter initiates a token list reformation as is hereinafter described. On the other hand, the appropriate response messages include:

(a) On the one hand, when a broadcast message is transmitted, the transmitter expects an acknowledgment control message from the primary receiver, which primary receiver is also called the token site, after the token site receives the broadcast message. The broadcast message format may be in accord with FIG. 2 whereas the acknowledgment message format may be in accord with FIG. 3. On the other hand, the receivers in the broadcast group do not provide acknowledgment messages but rather function as in the aforedescribed negative acknowledgment system;

(b) When a receiver detects the event that it did not receive, or missed, a broadcast message, the station transmits a retransmission request message (FIG. 3). Upon the token site detecting the retransmission request, the missed broadcast message is retransmitted this time not from the original transmitting station but rather from the token site (FIG. 2); and (c) When a token is passed from a present token site to a next token site, the present token site excepts a confirmation message from the next token site.

In addition to the foregoing functions and steps, our protocol contemplates the following functions and steps:

(a) If a transmitter receives an acknowledgment control message from a token site, the control message identifies a broadcast message by way of a global timestamp. If the global timestamp indicates that the broadcast message was transmitted subsequent to another broadcast message and an acknowledgment control message has not been received for the earlier message, it may be assumed that the earlier broacast message was not received at the token site and hence the transmitter may retransmit the broadcast message;

(b) If a transmitter expects a response control message from the token site but no response message is detected from the token site during some predefined time interval say T seconds, it may be assumed that the information message was not received at the token site and hence the transmitter may retransmit the message;

(c) If a transmitter expects a response control message from a token site but no response message is detected from the token site during some predefined number of retransmission attempts, say k attempts, it may be assumed that the token site is inoperable and that a token list reformation should be initiated as is hereinafter described; and (d) If any message is detected from a token site, it may be assumed that the token site is operable.

So much for a more detailed description relating to the transmitter function within each station 30-i.

Turning now to a receiver function at each station 30-i, path 10 is monitored by the station so as to detect whether or not the station is or is not a destination station. On the one hand, if the destination address field of a packet indicates that the station is not an intended destination station, the message may be discarded. On the other hand, if the destination address field of a packet indicates that the station is an intended destination station, the message is read and placed into an input queue. Station 30-i is further adapted to process messages in the input queue and in the course thereof to move messages from the input queue to a respective one of three other queues:

(a) broadcast messages are placed in a broadcast queue, $Q_b$;

(b) control messages including acknowledgment messages, token confirmation messages, and retransmission request messages are placed in a control $Q_c$; and (c) retransmitted messages destined for station 30-i as well as token list reformation messages are placed in a primary queue, $Q_p$. Messages in the input queue are processed using the above steps before the same messages are processed within any of the other three queues.

On the one hand if any of the four queues into which a message is being placed is already full, that message is discarded. This discarding prevents the system from becoming deadlocked. For example, in the event that broadcast messages were allowed to fill both the input queue and the broadcast queue $Q_b$, acknowledgment messages could not be received. In this event, the broadcast messages would not be removed from either of the queues. In parallel fashion, in the event that control messages were allowed to fill both the input queue and the control queue $Q_c$, a retransmitted message, which might be required to process an acknowledgment message, might not be received.

On the other hand, when the input queue is empty, messages in the control queue $Q_c$ are processed if possible. After a message in the control queue $Q_c$ is processed, the input queue is examined to determine whether or not any new message has been received by station 30-i. If the input queue has a new message, the new message(s) is processed as aforesaid; else a next message in the control queue $Q_c$ is processed. Ultimately the control queue $Q_c$ becomes empty or becomes blocked. How the control queue may be blocked will soon be described. In the interim, the next message in the primary queue $Q_p$ is processed if there is such a message. Thereafter, the input queue is reexamined and the above steps are repeated.

As to the control queue $Q_c$ being blocked, blocking may occur, for example, when an earlier acknowledgment message is missing. A missing acknowledgment message means that a broadcast message must be retransmitted. Blocking may also occur when a new token list is being used. This latter point will be made more clear hereinafter.

In accord with the instant protocol as described, it becomes evident that the messages in the control queue $Q_c$ and the primary queue $Q_p$ are processed in the same order as those respective messages are received. Messages in the broadcast queue may be removed and processed within station 30-i concurrently with the processing of messages in the control queue $Q_c$. This step enables an acknowledgment message to bypass a list of broadcast messages waiting to be acknowledged. This step also enables a retransmission message to bypass a list of acknowledgment messages.

Placing the acknowledgment messages, token confirmation messages, and retransmission request messages in the same control queue $Q_c$ results in the messages being ordered within the queue in the same order as they are received at station 30-i. As a result, the receiver function may readily determine which retransmission request messages should be responded to.

Also, placing retransmitted messages and token list reformation messages in the same primary queue $Q_p$ permits station 30-i to readily determine when a reformation has started. In such an event, the retransmission requests need not be processed, or replied to.

As mentioned, the messages in the control queue $Q_c$ are either token confirmation messages, acknowledgments, or requests for retransmission. We now described in more detail some aspects of the instant protocol with respect to these control messages.

A confirmation message is transmitted from the next token site to the present token site to signal, among other reasons, the present token site that the next token site is prepared to service retransmission requests. The "next" token site then becomes the "present" token site and processes, among other things, all retransmission request in its control queue $Q_c$. That is, i.e. those transmission requests which are received between the transmitting of its configurmation message and the receiving of a next confirmation message from a still other next token site. The present token site services retransmission requests from the time it transmits a confirmation message until the next confirmation appears in its control queue $Q_c$. If a token site misses a confirmation message, it is possible that more than one site may service retransmissions, however, this does not cause any confusion.

As is next described, acknowledgment messages are processed by all of the receivers. The acknowledgment messages are also used to assign timestamps to the broadcast messages, and to track the token site. A control message format is illustrated in FIG. 3. At a receiving site, each acknowledgement message is verified against local control information. The local control information includes a token list (which has the the token list version number, the present token site and list version number, the present token site and a list of operable sites in the broadcast group), a global timestamp of the last acknowledgment processed by the receiver site, and a list of source message sequence numbers correlated with the last timestamped message from each site.

The receiver is adapted to use the token site number and the token list version number from the acknowledgment message to determine if the acknowledgment is from the valid taken site. If the acknowledgment is not from the expected token site, either the acknowledging site or the receiving site is not using the correct token list. To solve this problem, our protocol contemplates that each time a new token list is formed, the token list version number is incremented. Therefore, by comparing the token list version number from the local control information with the token list version number field from the acknowledgment message, it can be determined whether the acknowledging site or the receiver has the most recent token list. Whichever site has an obsolete token list, requests and obtains a new token list before processing can continue. The next token site field tells the receiver the next site which will acknowledge a message. This next token site field may also be checked against the token list.

The acknolwedgment current being processed is called current acknowledgement. Since global timestamps increase incrementally, comparing the timestamp of the current acknowledgment with the timestamp of the last acknowledgment processed permits each receiver to readily identify missing acknowledgments. If the timestamp of the current acknowledgment is less than or equal to the last acknowledgment processed, it is a retransmitted version of a previously processed acknowledgment, and it is discarded. This type of acknowledgment can occur when a token site misses a confirmation message and trys to transfer the token again.

A broadcast message is not considered to be transmitted correctly until it is received and acknowledged by the token site. A source persists in transmitting a broadcast message until it receives an acknowledgment from the token site. Each time a source transmits a new broadcast message it increments its source message sequence number. Therefore the source message sequence number field of the acknowledgement message uniquely identifies the broadcast message to which the acknowledgment applies. Based upon the current acknowledgment, a receiver can adjust its broadcast message sequence. If a receiver missed a message that the token site acknowledged, the acknowledged broadcast message is not in the broadcast queue of the receiver. Hence, a request for the retransmission of this message is made. When the acknowledged message is in the broadcast queue of the receiver, the global timestamp of the acknowledgment is assigned to the message. Messages prior to it in the broadcast queue which have not been timestamped are discarded. The messages prior to the acknowledged message were missed by the token site and will have to be retransmitted by the source.

We now turn our attention even more specifically to the functioning of the token site. The token site is responsible for acknowledging broadcast messages and answering retransmission requests. It responds to a retransmission request by retransmitting the requested message. A broadcast message may be retransmitted, for example, because the transmitter missed the original acknowledgment. The broadcast messages in the broadcast queue $Q_b$ at the token site are sequentially acknowledged with an appropriate global timestamp. The token site can determine if a message is being retransmitted based on the source message sequence number of the last timestamp message from the source site. If a broadcast message in the broadcast queue $Q_b$ has previously been acknowledged, the token site retransmits the original acknowledgment. Broadcast messages, which have not been previously acknowledged, are acknowledged with an incrementally increasing global timestamp.

In one embodiment, the present token site transfers the token to the next token site as determined from the token list after acknowledging a predetermined number, say $K_w$, of broadcast messages. The present token site continues responding to retransmission requests until the confirmation message for the token transfer is received from the next token site. If the present token site misses the confirmation message, retransmission requests may be answered by more than one site. However, all sites which have accepted the token have the same set of messages, and the requesting site can simply discard the redundant answer.

A token site, among other steps, either processes acknowledgment messages as a normal receiving site or retransmits a confirmation message for the acknowledgment. If the acknowledgment is a new acknowledgment, the token site processes it as a normal receiving site. If the acknowledgment is a retransmitted acknowledgment, it indicates that a previous token site has missed the confirmation message for that acknowledgment. The appropriate confirmation message is retransmitted. A present token site, in this illustrative embodiment, acknowledges $K_w$ messages before transferring the token to the next token site. Once the present token site trys to transfer the token, it does not acknowledge any more messages even if it does not receive a confirmation message from the next token site. Therefore, at most one token site will acknowledge any broadcast message.

FIG. 5 illustrates the aforedescribed interaction among the present site, the next token site, a receiver and a transmitter.

The token list is reformed when the set of operable sites in a broadcast group changes. However, in a loosely coupled, distributed system, linked by an unreliable communication channel, sites which have actually failed cannot be distinguished from sites which are too busy to answer communication messages or from sites which have missed the messages because of channel errors or buffer overflows. According to our protocol, a site is considered to be operable as long as other sites can communicate with it, and elicit a response. If a site is unable to obtain a response from another site after k attempts, that non-responding site is assumed to have become inoperable. Therefore, it is possible that a slow site may mistakenly be assumed to have failed. The value of k should be large enough that slow sites are not frequently assumed to be inoperable, but small enough to detect a failure in a responable amount of time.

Two types of token site failures are detected with our token passing protocol:

(a) A token site failure is detected when an acknowledgment cannot be elicited for a broadcast message or when retransmission of an earlier message cannot be obtained and (b) A failure of a next token site is detected when a confirmation message for the token passing message cannot be obtained from the next token site.

When sites in the token list fail, the token list must be reorganized (or reformed) to remove any inoperable sites. The token list must be reformed when a previously inoperable site recovers and seeks to rejoin the token list.

Our protocol deals with the above-identified two types of token site failures and hence two types of token list reformation. Type I reformation occurs when the token site fails. The token is actually lost in this case. Type II reformation occurs when either the next token site is inoperable or a site seeks to rejoin the token list. The method for determining a new version of the token list differs for the two types of reformation. For Type I reformation, since the token is actually lost, a voting process must take place in order to form a new list. For Type II reformation, the new list is formed by adding a site to or deleting a site from the old list. After a new list is formed, it must be agreed upon and must be distributed to all operational sites. The design of our reformation protocol is complicated by the fact that during the token list reformation phase or reliable broadcast feature is not guaranteed and messages can be lost.

Broadly, the reformation protocol must tolerate any number of lost messages and must not be blocked by sites that fail after the reformation starts. To assure the correctness of the token scheme, it must also preserve two basic properties:

(a) Only one token can exist at a time and
(b) The global timestamps issued by the token site are unique and form an incrementally increasing sequence. Our description of the reformation aspect of our protocol is conveniently organized in three phases:

Phase I: Form a new token list.
Phase II: Check the validity of the new list and obtain votes of agreement from members in the list.
Phase III: If a consensus is obtained, commit to the new token list and generate a new token.

The site which discovers a token site failure starts the reformation process and is called the originator. In Phase I, the originator forms a new token list. In a Type I reformation, the originator is the transmitter which detects the token site failure. The originator invites sites in the broadcast group to join its reformation group. In a Type II reformation, the originator is the token site. The token site forms a new token list by adding a site to or deleting a site from the old list.

In Phase II, the validity of the new list is checked. The validity check step guarantees that there exists only one valid list in the system at a time. This satisfies the requirement that only one token can exist at a time. The validity check step guarantees that the list has the information regarding the last assigned timestamp in the system. This satisfies the requirement that the timestamps issued by the token site are unique and form an incrementally increasing sequence. One valid list is guaranteed by requiring that a valid list have a combination of sites which only one list can obtain. For example, only one list can obtain a majority of the sites if each site can only join one list. The second requirement is satisfied by requiring that a valid list contain sites which are capable of determining the token information. The requirement for a valid group will be elaborated on in the next section.

If a valid group is not formed, the originator releases the sites in its reformation group. The reformation process will again be initiated by some, perhaps other, site. This is repeated until a new token site is in charge. If a valid group is formed the originator transmits a copy of the new token list to all of the sites in the broadcast group. Each site acknowledges the list. However, it is possible for a member in the group to reject the new list because it timed out before it received the list. To guarantee that the reformation process does not become blocked when the originator fails, a site can leave a reformation group after a timeout. The timeout occurs when no messages are received from the originator during some specified time period. Such a site is free to join another reformation group. Because of the timeout a site may join more than one group. Phase III is needed to prevent both groups from considering themselves valid because of an overlapping set of sites.

In Phase III, if a unanimous vote regarding the new list is obtained, the originator generates a new token and passes it to the new token site. On detecting this message, all of the sites commit to the new token list. If a unanimous vote is not obtained, the originator releases the members in the group and abort the new list.

FIG. 5 illustrates in summary form the three phase protocol for a reformation process.

Figure 6:
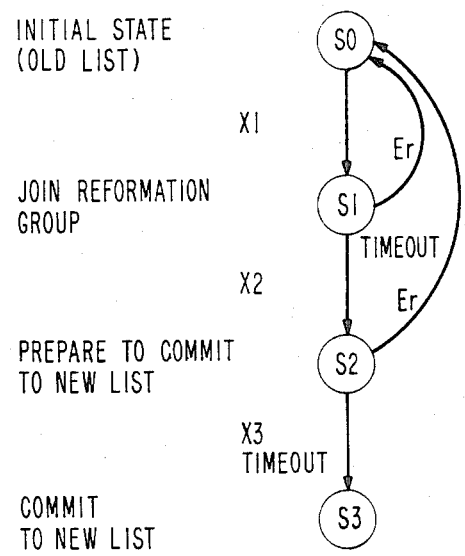
FIG. 6 illustrates even further in state form a transition among sites according to the reformation aspect of the instant protocol.
Figure 4:
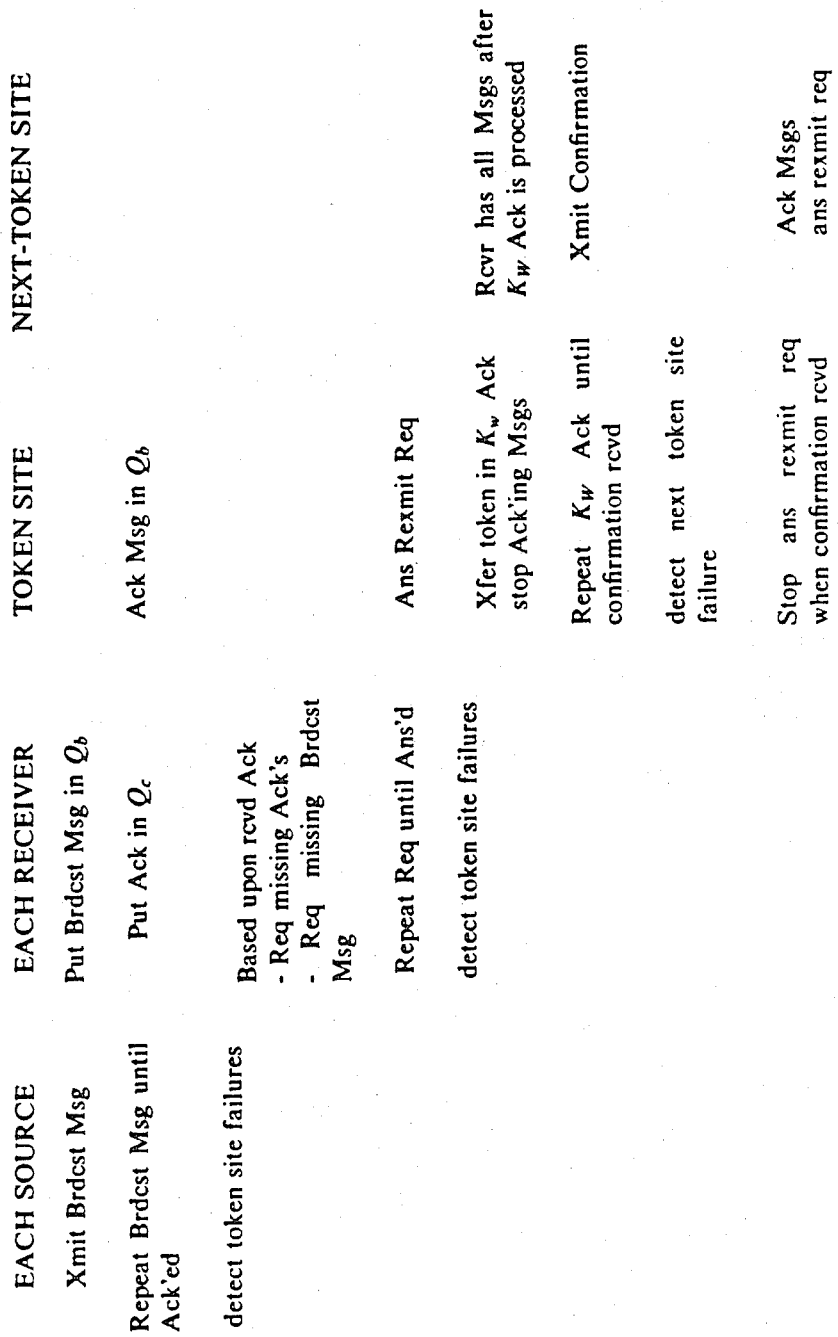
FIG. 4 illustrates in state form an interaction among a source, receiver, present token site and next token site and is useful in describing the principles of the invention.

FIG. 6 illustrates a corresponding state transition of a member site during the reformation protocol. Each site has four states: $S_0$ (initial state), $S_1$ (when $X_1$ is received), $S_2$ (when $X_2$ is received), $S_3$ (when $X_3$ is received). At $S_0$ the site has the old token list, at $S_1$ the site joins a reformation group, at $S_2$ the site is prepared to commit to new token list, and at $S_3$ the site commits to the new token list. When broadcast release message $E_r$ is received in $S_1$ or $S_2$, the site aborts the new list. If no site failure or message loss occurs, all sites will commit or abort the new list unanimously. However, if an originator failure or lost messages causes a timeout, a member either commits or aborts the new list depending solely on its state.

if a site is in $S_1$, it did not vote on the new list, therefore, the new list is not valid. The site abort the new list.

if a site is in $S_2$, it is not able to determine whether the list is valid or not, but it will assume that it is valid and commit the list. The assumption prevents the situation where a group of such sites form another list from the old list when the new list is valid.

Note that different commit or abort decisions may be reached by different sites, however, a unanimous vote was not obtained in Phase II, hence a new token was not geneated. Since no site has the valid token, the reformation will be reinitiated. All sites eventually agree on one list. Since this does not violate the requirement that there exists only one valid token list and only one valid token when the reformation is complete, the different decisions reached by each site does not cause an error.

As a result of the aforedescribed protocol including the step related to the global timestamp, each and every receiver in the ssytem receives all broadcast messages in an identical sequence or order.

Although the invention has been described and illustrated in detail, it is to be understood that the above description is presented primarily for the purpose of illustration and example. For brevity, only some alternative modifications of the principles of the invention have been disclosed. Still other modifications of the principles of this invention will occur to those skilled in the art. Accordingly, the invention is not be be considered limited by the embodiments shown, but limited only to the appended claims.

What is claimed is:

1. A method for controlling digital signals in a communications system, said system including a communications path, a plurality of stations coupled to said path, said method including the steps of writing signals on said path and reading signals from said path and CHAR- ACTERIZED IN THAT said method further comprises the steps of:
- at an alterable one of said stations serving as a source station, transmitting an information message intended for an alterably predetermined broadcast group of said stations, where said information message comprises an address field and a data field, and where said stations are assigned to a broadcast group independently of said source station; and
- at an alterably preselected one of said stations in said broadcast group serving as a primary receiver, receiving said information message and transmitting an acknowledgement control message to said source station in response to detecting said information message.

2. The method defined in claim 1 further comprising the step of:
- at said source station, upon detection of the absence of said acknowledgment control message, retransmitting said information message to said intended broadcast group of stations.

3. The method defined in claim 1 further comprising the step of:
- at said primary receiver, inserting a global time stamp in said acknowledgment control message.

4. The method defined in claim 1 further comprising the step of:
- at said primary receiver, detecting a retransmission request control message from some station in said broadcast group and
- responsive to said retransmission request message, transmitting said information message from said primary receiver, rather than from said source station to said some station.

5. The method defined in claim 1 further comprising the steps of:
- at said primary receiver, determining a next primary receiver from a token list and
- transmitting a token to said next primary receiver.

6. The method defined in claim 5 further comprising the steps of:
- at said next primary receiver, transmitting a token confirmation message to said primary receiver and
- at said primary receiver, relinguishing said primary receiver function to said next primary receiver in response to detecting said confirmation message.

7. The method defined in claim 2 further comprising the step of:
- at said source station, upon retransmitting said information message a predefined number of times and upon detection of the absence of said acknowledgment message, reforming a token list.

8. The method defined in claim 5 further comprising the step of:
- at said primary receiver, upon detection of the absence of a token confirmation message from said next primary receiver, retransmitting said token to said next primary receiver.

9. The method defined in claim 8 further comprising the step of:
- at said primary receiver, upon retransmitting said token a predefined number of times and upon detection of the absence of said token confirmation message, reforming a token list.

10. The method defined in claim 1 further comprising the step of
receiving said information message at each station in said broadcast group in the same message sequence.

11. A communications system for controlling digital signals, said system including a communications path, a plurality of stations coupled to said path, means for writing signals on said path and means for reading signals from said path and CHARACTERIZED IN THAT said system further comprises:
- at an alterable one of said stations serving as a source station, means for transmitting an information message intended for an alterably predetermined broadcast group of said stations on said communications path, where said information message comprises an address field and a data field, and where said stations are assigned to a broadcast group independently of said source station; and
- at an alterably preselected one of said stations in said broadcast group serving as a primary receiver, receiving said information message and means for transmitting an acknowledgment control message to said source station in response to detecting said information message.

12. The system defined in claim 11 further comprising:
- at said source station, means responsive to the detection of the absence of said acknowledgment control message for retransmitting said information message to said intended broadcast group of stations.

13. The system defined in claim 11 further comprising:
- at said primary receiver, means for inserting a global timestamp in said acknowledgment control message.

14. The system defined in claim 11 further comprising:
- at said source station, means for removing said information message from a broadcast message queue upon detection of said acknowledgment control message.

15. The system defined in claim 11 further comprising:
- at said primary receiver, means for detecting a retransmission request control message from some station in said broadcast group and
- means responsive to said retransmission request message for transmitting said information message from said primary receiver, rather than from said source station, to said some station.

16. The communications system defined in claim 11 further comprising:
- at said primary receiver, means for determining a next primary receiver from a token list and
- means for transmitting a token to said next primary receiver.

17. The system defined in claim 16 further comprising:
- at said next primary receiver, means for transmitting a token confirmation message to said primary receiver and
- at said primary receiver means for relinquishing said primary receiver function to said next primary receiver in response to detecting said confirmation message.

18. The system defined in claim 12 further comprising:
- at said source station, means upon retransmitting said information message a predefined number of times and upon detection of the absence of said acknowledgment message for reforming a token list.

19. The system defined in claim 16 further comprising:
at said primary receiver, means upon detection of the absence of a token confirmation message from said next primary receiver for retransmitting said token to said next primary receiver.

20. The system defined in claim 19 further comprising:
at said primary receiver, means upon retransmitting said token a predefined number of times and upon detection of the absence of said token confirmation message for reforming a token list.

21. The system defined in claim 11 further comprising means for receiving said information message at each station in said broadcast group in the same message sequence.

22. Station apparatus for controlling digital signals in a communications system, said system including a communications path, a plurality of stations coupled to said path, said station apparatus including means for writing signals on said path and means for reading signals from said path and CHARACTERIZED IN THAT said station apparatus further comprises:
means for assigning said station apparatus to one of a plurality of broadcast groups that receive information messages intended for said one broadcast group, where said information message comprises an address field and a data field;
source station means for transmitting an information message intended for a predetermined broadcast group of said stations and
electrically activatable primary receiver means for transmitting an acknowledgment control message to a source station in response to detecting said information message.

23. The apparatus defined in claim 22 further comprising:
source station means responsive to the detection of the absence of said acknowledgment control message for retransmitting said information message to said intended broadcast group of stations.

24. The apparatus defined in claim 22 further comprising:
primary receiver means for inserting a global timestamp in said acknowledgment control message.

25. The apparatus defined in claim 22 further comprising:
source station means for removing said information message from a broadcast message queue upon detection of said acknowledgment control message.

26. The apparatus defined in claim 22 further comprising:
primary receiver means for detecting a retransmission request control message from some station in said broadcast group and
primary receiver means responsive to said retransmission request message for transmitting said information message from said primary receiver, rather than from a source station, to said some station.

27. The station apparatus defined in claim 22 further comprising:
primary receiver means for determining a next primary receiver from a token list and
primary receiver means for transmitting a token to said next primary receiver.

28. The apparatus defined in claim 27 further comprising:
next primary receiver means for transmitting a confirmation message to a primary receiver and
primary receiver means for relinquising a primary receiver function to a next primary receiver in response to detecting said confirmation message.

29. The apparatus defined in claim 23 further comprising:
source station means upon retransmitting said information message a predefined number of times and upon detection of the absence of said acknowledgment message for reforming a token list.

30. The apparatus defined in claim 27 further comprising:
primary receiver means upon detection of the absence of a token confirmation message from said next primary receiver for retransmitting said token to said next primary receiver.

31. The apparatus defined in claim 30 further comprising:
primary receiver means upon retransmitting said token a predefined number of times and upon detection of the absence of said token confirmation message for reforming a token list.

32. The apparatus defined in claim 22 further comprising:
primary receiver means for assuring that each information message is received at each station in said broadcast group in the same message sequence.

33. A method for controlling digital signals in a communications system, said system including a communications bus, a plurality of stations coupled to said bus, said method including the steps of writing signals on said bus and reading signals from said bus and CHARACTERIZED IN THAT said method further comprisies the steps of:
alterably defining a broadcast group of said stations for receiving broadcast information messages which comprise an address field and a data field and which are intended to be received by each of said stations in a defined broadcast group;
at an alterable one of said stations coupled to said bus serving as a source station, transmitting said information messages intended for said broadcast group; and
at an electrically alterable preselected one of said stations in said broadcast group serving as a primary receiver, receiving said information messages and transmitting an acknowledgment control message to said source station in response to detecting said information message.

34. A communications system for controlling digital signals, said system including a communications path, a plurality of stations coupled to said path, means for writing signals on said path and means for reading signals from said path and CHARACTERIZED IN THAT said system further comprises:
means for alterably defining a broadcast group of said stations for receiving broadcast information messages which comprise an address field and a data field and which are intended to be received by each of said stations in a defined broadcast group;
first means, within each of said stations for transmitting said information messages intended for said broadcast group; and
second means within each of said stations for alterably designating one station in a broadcast group to serve as a primary receiver, for transmitting an acknowledgment control message to said source station in response to detecting an information message send to said primary receiver's broadcast group.

35. A communications system for controlling digital signals, said system including a communications path, a plurality of stations coupled to said path, each of said stations including means for writing signals on said path and means for reading signals from said path and further CHARACTERIZED IN THAT:

each of said stations is electrically and alterably designated to belong to one of a plurality of broadcast groups;

each of said stations includes means for broadcasting to a selected broadcast group of stations by writing an information message on said communications path, with said information message having an address field designating said broadcast group and a data field destined to said broadcast group; and each of said stations includes means for electrically and thus alterably characterizing said station as a primary receiver, being the member of its broadcast group that is charged with the task of sending acknowledgement signals to stations broadcasting to its group.

36. The system of claim 35 wherein said primary receiver designation is changed at preselected intervals.

37. The system of claim 35 wherein said primary receiver designation is changed upon failure of said primary receiver.

38. The system of claim 35 wherein said primary receiver retransmits an information message received from a transmitting station when a retransmission request is received from any station in its broadcast group.

39. A method for controlling digital signals in a system including a communications path, a plurality of stations coupled to said path CHARACTERIZED BY:

a step of designating each of said stations to belong to one of a pluarlity of broadcast groups;

a step of transmitting an information message from any of said stations to any one of said plurality of broadcast groups, said information message having an address field designating said one broadcast group and a data field destined to said broadcast group; and a step of alterably designating one station in each of said broadcast groups as a primary receiver, such a receiver being the sole member of its broadcast group that is charged with the task of sending acknowledgement signals to stations broadcast to its group.

* * * * *